(No Model.)
T. W. WELLER.
EVAPORATOR.
No. 287,487. Patented Oct. 30, 1883.
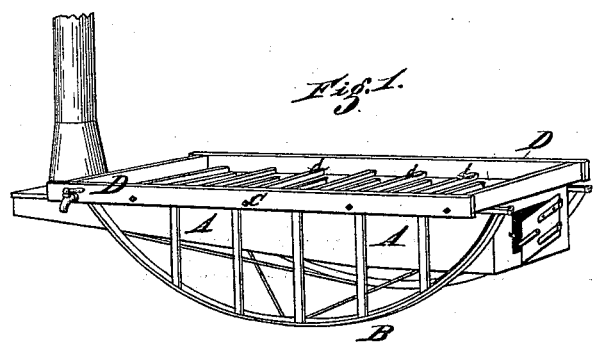
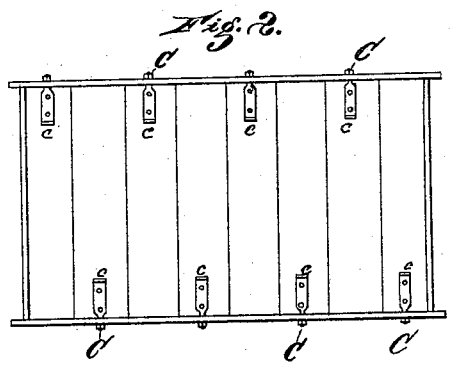
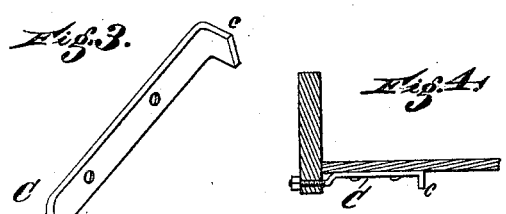
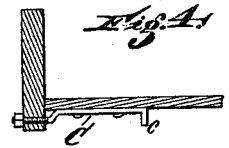
Attest
Jno. E. Stiles,
E. W. Rector
Inventor
Thomas W. Weller
by Stem & Peck
his attys.
N. PETERS, Photo-Lithographer, Washington, D. C.

UNITED STATES PATENT OFFICE.

THOMAS W. WELLER, OF LOUISVILLE, KENTUCKY, ASSIGNOR TO BRENNAN & CO., SOUTH WESTERN AGRICULTURAL WORKS.

EVAPORATOR.

SPECIFICATION forming part of Letters Patent No. 287,487, dated October 30, 1883.

Application filed July 19, 1883. (No model.)

*To all whom it may concern:*

Be it known that I, THOMAS W. WELLER, a citizen of the United States, residing at Louisville, in the county of Jefferson and State of Kentucky, have invented certain new and useful Improvements in Evaporators, of which the following is a full, clear, and exact description, reference being had to the accompanying drawings, forming a part of this specification.

My invention relates to an improvement in evaporators of the class known as the "Cook Evaporators," as shown in the patent of D. M. Cook, June 22, 1858, No. 20,631; and it consists of a guide or guides on the bottom of the pan, to hold it in the proper place on the furnace.

In the accompanying drawings, Figure 1 is a perspective view of the furnace and evaporating-pan. Fig. 2 is a bottom view of the pan. Fig. 3 is one of the guides, which also serves as a bolt to fasten together the bottom and sides of the pan. Fig. 4 is a section of the side and bottom of the pan and bolt or guide.

The same letters of reference indicate corresponding parts in all the figures.

In this class of evaporators the pan is provided with partitions extending nearly across the bottom, and as the furnace is rocked so as to make one end a little higher than the other the sap flows across the pan, past the end of the first partition into the second division of the pan and back across the pan, and so on until it reaches the other end of the pan. The sides of the pan extend several inches beyond the furnace, so as to provide a cooling-surface for the sap, which must flow over this cooler part of the pan every time it passes from one partition to another.

In the accompanying drawings, A represents the furnace, which rests upon rockers B. D is the evaporating-pan, and *d d d* are partitions extending almost across the pan from each side alternately. The ends and sides of the pan are of wood, and the sides are usually fastened to the bottom by bolts C, riveted to the bottom of the pan, as shown in Figs. 2 and 4. Unless the bottom of the pan is provided with guides it cannot be kept in proper place on the furnace, so as to have the proper extension beyond the sides of the furnace to provide the cooling-surface. Heretofore these guides have been made of long angle-irons extending the entire length of the pan, and fastened to the pan by rivets passing through the bottom of each section. This mode was not only expensive, but each rivet-hole had to be soldered to prevent leaking, and was constantly liable to get out of order, and liable to tear the bottom of the pan, and necessitated at least two rivet-holes in each section of the pan, which were always liable to get damaged and cause leakage.

My improvement consists in doing away with the angle-irons and extending four or more of the bolts C (usually the two end ones on each side) and bending the ends up, as shown at *c*, Figs. 3 and 4. These ends *c* are arranged at such a distance apart as to abut firmly against the sides of the furnace when the pan is in position, and hold it securely in place, affording a cheaper and far better guide than the old angle-irons.

I am aware that the described apparatus for evaporating juices by means of a movable furnace and pan, the latter provided with transverse ledges for the purpose described, is old, and do not claim the same; but What I do claim, and desire to secure by Letters Patent, is—

1. In an evaporating-pan of the nature described, the bolts for securing the sides and bottom of the pan together, having their inner ends bent at an angle to the bottom of the pan, so as to abut against the sides of the furnace and act as guides.

2. In the evaporating apparatus described, the pan D, when provided with the guides C, in combination with the furnace A.

3. The guides C on the bottom of the pan D, for holding the pan in position on the furnace.

THOMAS W. WELLER.

Witnesses:
  W. G. MUNN,
  L. W. HOMIRE.